US009659276B2

(12) United States Patent
Kuhl et al.

(10) Patent No.: US 9,659,276 B2
(45) Date of Patent: May 23, 2017

(54) METHOD AND SYSTEM FOR SOCIALIZING EVENTS

(75) Inventors: Travis Kuhl, Marina del Rey, CA (US); Steve Krutzler, Valencia, CA (US); Sarah Gallivan Mitchell, Marina del Rey, CA (US); Scott Rocher, Los Angeles, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 363 days.

(21) Appl. No.: 12/757,059

(22) Filed: Apr. 9, 2010

(65) Prior Publication Data
US 2011/0252331 A1 Oct. 13, 2011

(51) Int. Cl.
*G06F 3/048* (2013.01)
*G06Q 10/10* (2012.01)

(52) U.S. Cl.
CPC .................... *G06Q 10/10* (2013.01)

(58) Field of Classification Search
USPC ................................................ 715/741, 757
See application file for complete search history.

(56) References Cited

U.S. PATENT DOCUMENTS

| 7,797,345 B1* | 9/2010 | Martino et al. ............... 707/792 |
| 2007/0233736 A1* | 10/2007 | Xiong et al. ............... 707/104.1 |
| 2009/0112467 A1* | 4/2009 | Jiang et al. .................... 701/211 |
| 2009/0157693 A1* | 6/2009 | Palahnuk ......................... 707/10 |
| 2009/0171964 A1* | 7/2009 | Eberstadt et al. ................. 707/9 |
| 2012/0221645 A1* | 8/2012 | Anthru et al. ................ 709/204 |

* cited by examiner

Primary Examiner — William Trapanese
(74) Attorney, Agent, or Firm — James J. DeCarlo; Greenberg Traurig, LLP

(57) ABSTRACT

An example of a method includes determining, electronically, a social network associated with a user in response to the user visiting a web page. Further, the method includes determining, electronically, a first buddy of the user on the social network. Furthermore, the method includes identifying, electronically, a first event from events associated with the first buddy which matches an event associated with the web page. In addition, the method includes displaying the first event and information associated with the first buddy on the web page.

20 Claims, 10 Drawing Sheets

FIG. 5A

METHOD AND SYSTEM FOR SOCIALIZING EVENTS

BACKGROUND

Over a period of time, use of internet has increased. Websites have become interactive and provide a plethora of options to a user. With an increase in interactivity, time spent on the website also increases and thus revenue generation through advertisements or other modes also increases. Hence, it is desired to make websites interactive.

Some websites, for example event based websites display contents that changes frequently. For example, a website listing currently running movies has dynamic content which can change every week. A user can visit such a website and decide to purchase a ticket. The user can also interact with other online buddies through social networking websites, for example Facebook® or through any other mode of communication. However, this causes dependence on modes other than the movie website to interact with buddies and determine buddies who are interested in watching the movie.

SUMMARY

An example of a method includes determining, electronically, a social network associated with a user in response to the user visiting a web page. Further, the method includes determining, electronically, a first buddy of the user on the social network. Furthermore, the method includes identifying, electronically, a first event from events associated with the first buddy which matches an event associated with the web page. In addition, the method includes displaying the first event and information associated with the first buddy on the web page.

An example of a system includes a communication interface to enable communication with one or more electronic devices when desired. The system also includes a memory coupled to the communication interface for storing instructions. Further, the system includes a processor, coupled to the communication interface and the memory, and responsive to the instructions to determine a social network associated with a user in response to the user visiting a web page, determine a first buddy of the user on the social network, identify a first event from events associated with the first buddy which matches an event associated with the web page, and display the first event and information associated with the first buddy on the web page.

An example of an article of manufacture includes a machine-readable medium and instructions carried by the medium and operable to cause a programmable processor to perform determining, electronically, a social network associated with a user in response to the user visiting a web page. Further, the machine-readable medium carries instructions operable to cause the programmable processor to perform determining, electronically, a first buddy of the user on the social network. Furthermore, the machine-readable medium carries instructions operable to cause the programmable processor to perform identifying, electronically, a first event from events associated with the first buddy which matches an event associated with the web page. In addition, the machine-readable medium carries instructions operable to cause the programmable processor to perform displaying the first event and information associated with the first buddy on the web page.

BRIEF DESCRIPTION OF THE FIGURES

FIG. 5A-FIG. 5F depict screen shots for socializing events, in accordance with one embodiment.

DETAILED DESCRIPTION OF THE EMBODIMENTS

Figure 1:
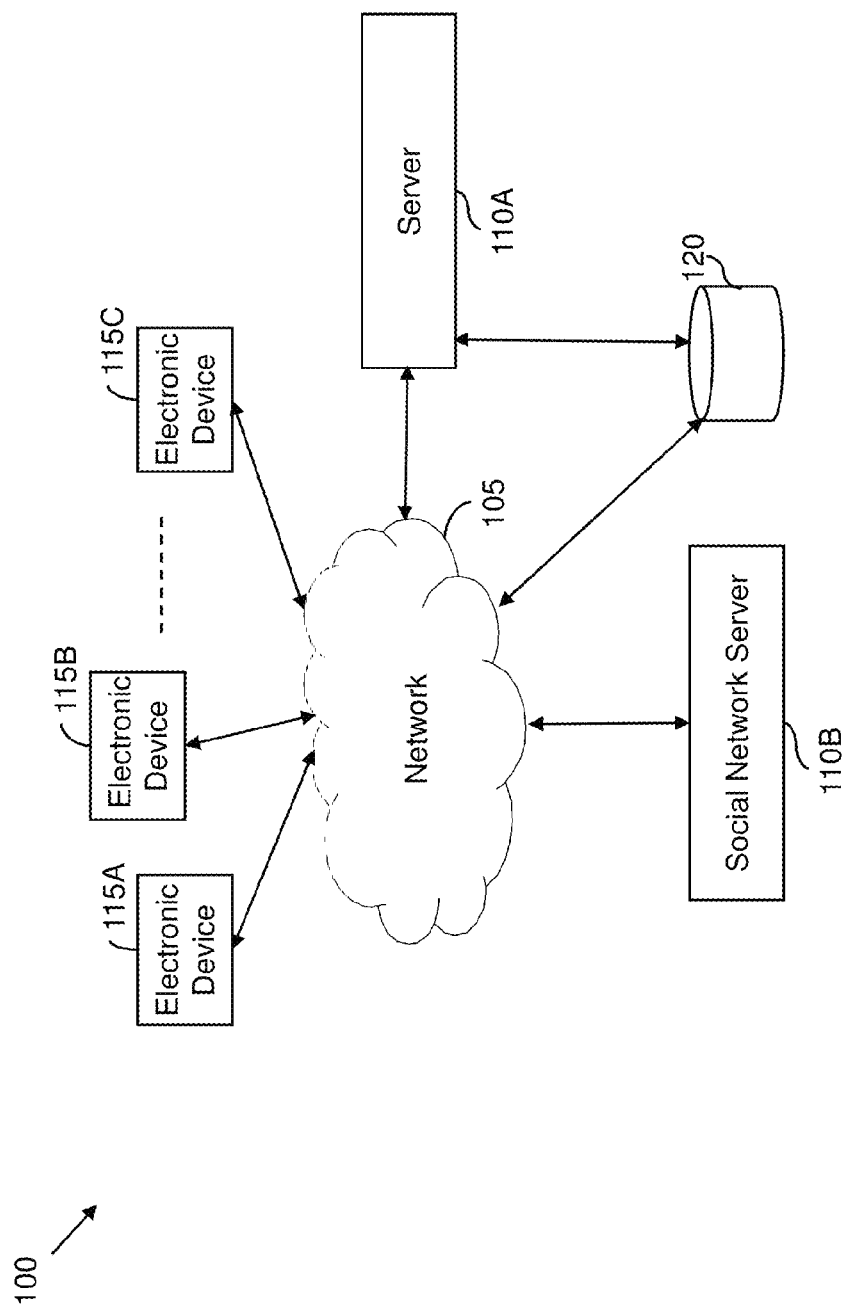
FIG. 1 depicts a block diagram of an environment, in accordance with one embodiment.

FIG. 1 depicts a block diagram of an environment 100. The environment 100 includes a server 110A connected to a network 105. The environment 100 further includes one or more electronic devices, for example an electronic device 115A, an electronic device 115B and an electronic device 115C which can communicate with each other through the network 105. Examples of the electronic devices include, but are not limited to, computers, mobile devices, laptops, palmtops, and personal digital assistants (PDAs). The electronic devices can also communicate with the server 110A through the network 105.

The server 110A, for example a Yahoo!® server can be coupled to a storage device 120.

The environment 100 can also include a social network server 110B that can be in electronic communication with the electronic devices through the network 105. The social network server 110B can be, for example, a Facebook® server.

An example of interaction among various entities in the environment 100 is now provided.

A user of the electronic device 115A may desire to obtain information about movies running currently in various theatres The user can visit various web sites, for example a web site "movies.yahoo.com" to get the information. A first web page derived from the web site ("movies.yahoo.com") can include multiple tabs. Examples of the multiple tabs include, but are not limited to, "In theatres", "Showtimes & Tickets", "Coming Soon", "Trailors & Clips", "News", "Box Office", and "Kids Videos".

The user can click on the tab "Showtimes & Tickets" to know the showtimes of various movies and book tickets accordingly. In response to the user clicking on the tab "Showtimes & Tickets", a second web page can be displayed to the user. The second web page includes names of various theatres of a desired location, for example that of a city. The second web page also displays information regarding the movies running currently in the theatres against name of the theatre. The information can include showtimes, name of the movie and other details. The first web page and the second web page can be hosted by the server 110A. Each showtime can be referred to as an event. The events displayed on the second web page can be referred to as events associated with the second web page.

When the second web page is displayed to the user, the server 110A can also determine whether the user is logged into the social network or not. In case the user is not logged in then the user can be prompted to login to the social network. Once the user logs in to the social network, the information that the user has logged into the social network can be sent to the server 110A. The server 110A then interacts with the social network server 110B to access and obtain buddy list of the user. The server 110A further checks events associated with buddies of the buddy list. The events associated with the buddies can be accessed from a database or a list stored by the server 110A in the storage device 120.

The events associated with the buddies include showtimes suggested by the buddies and are indicative of interest of the buddies. The database can also be stored in memory of the server 110A. The database can include user ID of each buddy and a movie showtime suggestion. The user ID of each buddy can be the user ID using which the buddy is registered with the social network server 110B or the social network. Optionally, additional information, for example user name, comments and other information can also be stored and present in the database. The server 110A identifies events associated with each buddy that matches the events associated with the second web page.

The events associated with buddies can then be displayed to the user, for example in a separate panel on right hand side of the second web page. Additional information associated with the buddies, for example names of the buddies, comments by the buddies, time and date when the suggestion was made and so on can also be displayed.

It is noted that the server 110A can also filter identified events before displaying the identified events to the user based on various factors. For example, filtering can be done based on suggestion date. Recent suggestions can be preferred over relatively older ones. Filtering can also be done based on past activities of the user and preferred buddies.

The server 110A also provides various options to the user in the separate panel, for example an option to comment on displayed event, an option to join the displayed event, an option to decline the displayed event, an option to delete the displayed event and so on.

The server 110A can also provide suggest option to the user. For example, when the user hovers cursor over a showtime associated with the second web page then a plurality of options can be displayed. The options include suggesting the showtime and buying ticket for the showtime. When the user clicks on the suggest option then the suggestion can be sent from the electronic device 115A to the server 110A through the network 105. The suggestion can then be stored as an event associated with the user using user ID of the user.

In some embodiments, if the user is not logged into the social network before clicking the suggest option then the user is prompted to do so. The user then enters the user ID and password. The suggestion is then stored using the user ID of the user in the storage device 120.

The server 110A can update the suggestions in the storage device 120 periodically or as and when the server 110A receives the suggestions from the users through the electronic devices.

In some embodiments, if access to activities of the buddies on the social network is provided to the server 110A then the server 110A can also update suggestions based on analysis of the activities. For example, if status message of a buddy on the social network includes "Interested in watching movie A at 5:00 PM in B theatre" then the server 110A can check if the event in the status matches with an event associated with the second web page. If yes then the event can be stored in the storage device 120 using user ID of the buddy and displayed.

It is noted that matching can include finding events that are of similar type, for example movies.

It is noted that the interaction between the electronic device 115A and the server 110A or between the electronic device 115A and the social network server 110B can be enabled using cookies of a browser of the electronic device 115A.

In some embodiments, the environment 100 can include one or more social network servers that are in electronic communication with the server 110A. The database in the storage device 120 can then include user IDs and events associated with the user IDs for each such social network. Based on the social network into which the user is logged in the events can be displayed. The events corresponding to different social networks can be displayed together on the second web page or in separate panels on the second web page or in a separate web page or in pop up.

In some embodiments, options can be provided to the user to enable broadcasting of suggestion on the social network. The server 110A can then send the suggestions to the social network server 110B which can then publish it in the social network. The publishing can include publishing link of the second web page or publishing the suggestion. The broadcasting can also be performed using emails and other modes of broadcasting, for example short message service.

It is noted that interaction among various entities in the environment 100 is explained using Yahoo!® Movies as an example. Similar interactions can be performed for various applications, for example Yahoo!® TV or websites including online events.

Figure 2:
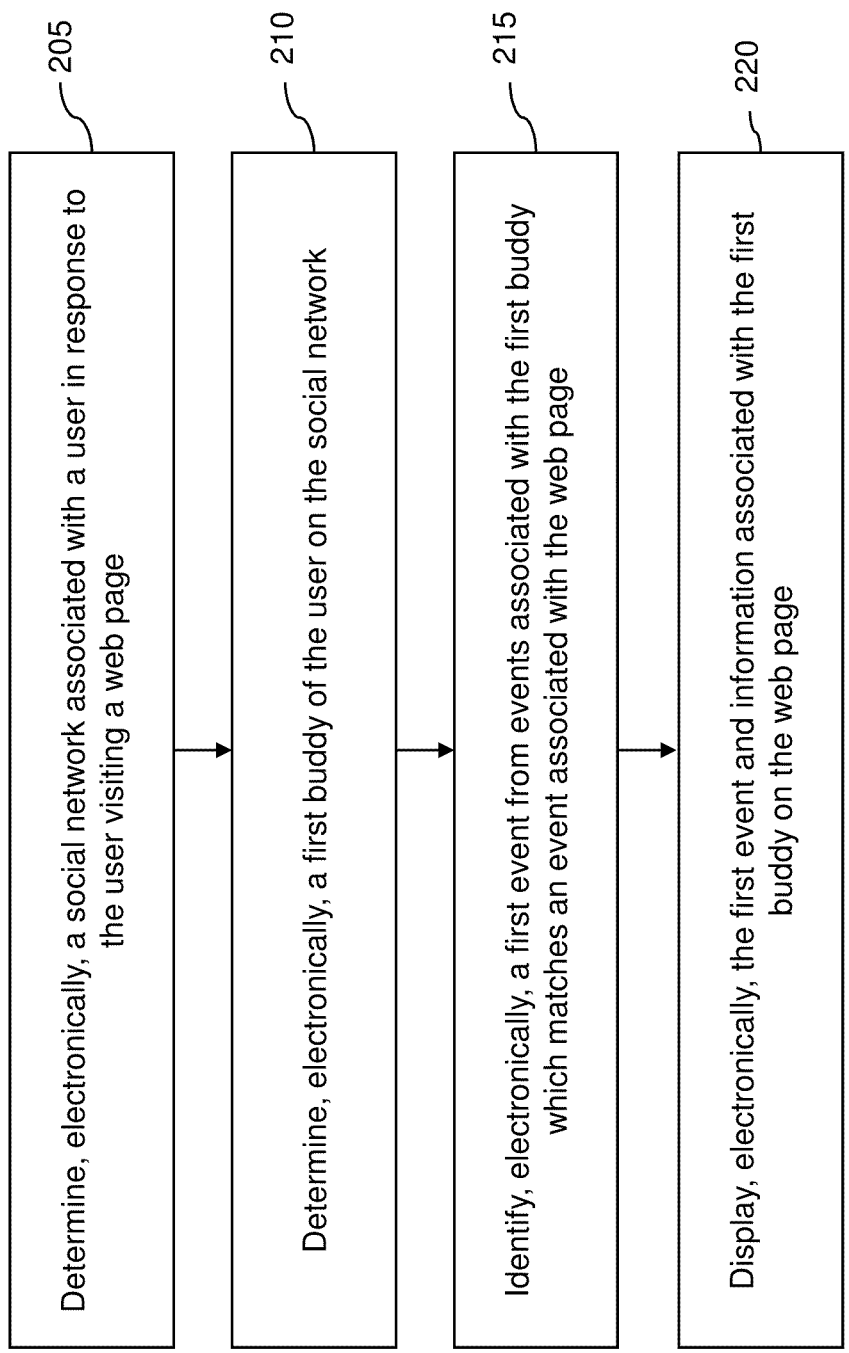
FIG. 2 depicts a method for socializing events, in accordance with one embodiment.

FIG. 2 depicts a method for socializing events. The method can be performed electronically, for example by using the server 110A.

At step 205, a social network associated with a user is determined in response to the user visiting a web page. In one example, a check is performed to determine if the user is logged into a social networking website or not. If yes then the social network corresponding to the social networking website is identified as the social network associated with the user. Else the user is prompted to login to the social network.

At step 210, a first buddy of the user is determined on the social network. The first buddy can be determined by accessing buddy list of the user on the social network. The buddy list can have more than one buddy. All buddies in the buddy list can be determined as buddies of the user.

At step 215, a first event is identified from the events associated with the first buddy which match an event associated with the web page. In one example, the event matching with the first event may be a showtime, for example 3 PM of a movie "Avatar" at a cinema hall "the bridge" showtime for Mar. 5, 2010.

The matching can include performing a check to determine if the first event and the event associated with the web page are of same type. For example, a check to determine whether the first event is a movie and the event associated with the web page is also a movie. If the events are of same type then the events can be considered to be matching.

It is noted that events associated with all the buddies which match the events associated with the web page can be identified. In some embodiments, the events can be filtered based on various parameters.

At step 220, the first event and information associated with the first buddy is displayed on the web page. In one example, the first event and information associated with the first buddy can be displayed in a separate panel on the right hand side of the web page. The information associated with the first buddy can include name of the first buddy, comments by the first buddy, time and date when the suggestion was made by the first buddy, and other information.

It is noted that events associated with all the buddies which match the events associated with the web page can be displayed. Information associated with all such buddies can also be displayed.

In some embodiments, the user is provided with an option to make a suggestion regarding a second event associated with the web page. The option is provided to the user when the user hovers a cursor on a showtime associated with the second event. If the user clicks on the option to suggest the second event to the first buddy or other buddies, a check is performed to determine if the user is logged in to the social network. If the user is not logged in to the social network then the user is prompted to do so. The second event can be included in the separate panel of the web page. If the first buddy visits the web page, then the second event suggested by the user is displayed to the first buddy.

The suggestions can be broadcasted on the social network. The suggestion can be published on the social network. The publishing can include publishing link of the second web page or publishing the suggestion. The broadcasting can also be performed using emails and other modes of broadcasting, for example short message service.

A list of events associated with the user can be updated based on the user's usage of the web page. For example, the user makes a suggestion on a particular day, and then the suggestion is stored. If the user makes another suggestion on the same day, then the suggestion and another suggestion both can be stored. Similar, updating approach can be followed for the first buddy and other buddies.

In one embodiment, the options can be provided for inputting comments, on the web page, by the user and the buddies. The comments can be associated with the events. The options can also be provided for joining the events, declining the events or deleting the events.

Figure 3:
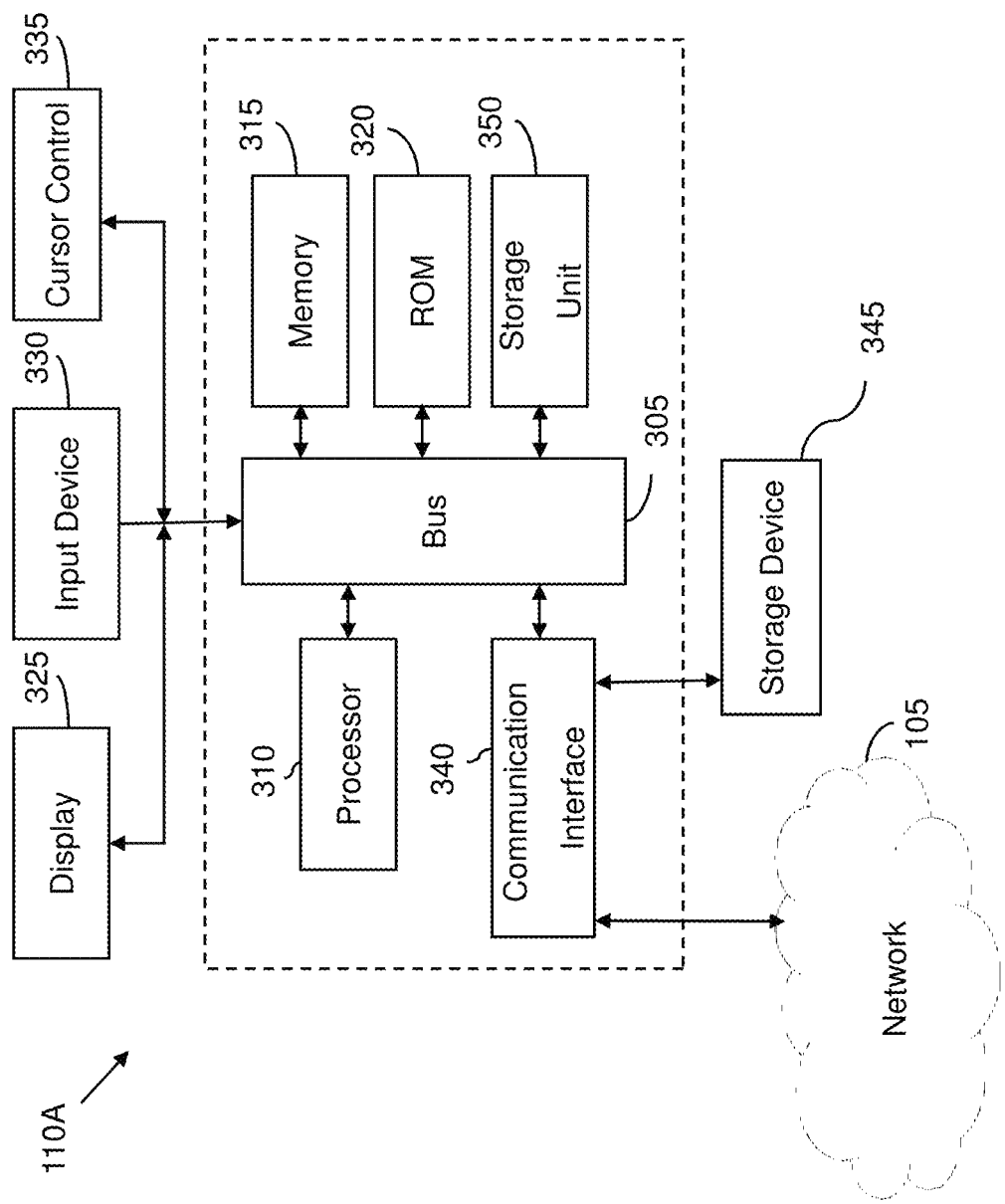
FIG. 3 depicts a block diagram of a server, in accordance with one embodiment.

FIG. 3 depicts a block diagram of a server 110A. The server 110A includes a bus 305 for communicating information, and a processor 310 coupled with the bus 305 for processing information. The server 110A also includes a memory 315, for example a random access memory (RAM) coupled to the bus 305 for storing instructions to be executed by the processor 310. The memory 315 can be used for storing temporary information required by the processor 310. The server 110A further includes a read only memory (ROM) 320 or other static storage unit coupled to the bus 305 for storing static information and instructions for processor 310. A storage unit 350, such as a magnetic disk or hard disk, can be provided and coupled to the bus 305 for storing information.

The server 110A can be coupled via the bus 305 to a display 325, for example a cathode ray tube (CRT) or liquid crystal display (LCD), for displaying information. An input device 330, including various keys, is coupled to the bus 305 for communicating information and command selections to the processor 310. In some embodiments, cursor control 335, for example a mouse, a trackball, a joystick, or cursor direction keys, for command selections to the processor 310 and for controlling cursor movement on the display 325 can also be present. The functioning of the input device 330 can also be performed using the display 325, for example a touch screen.

Various embodiments are related to the use of the server 110A for implementing the techniques described herein, for example in FIG. 1. The techniques can be performed by the server 110A in response to the processor 310 executing instructions included in the memory 315. The instructions can be read into the memory 315 from another machine-readable medium, such as the storage unit 350. Execution of the instructions included in the memory 315 causes the processor 310 to perform the techniques described herein.

The term machine-readable medium can be defined as a medium providing data to a machine to enable the machine to perform a specific function. The machine-readable medium can be a storage media. Storage media can include non-volatile media and volatile media. The memory 315 can be a volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, optical disk, punchcards, papertape, a RAM, a PROM, EPROM, and a FLASH-EPROM.

In some embodiments, the machine-readable medium can be transmission media including coaxial cables, copper wire and fiber optics, including the wires that include the bus 305. Transmission media can also take the form of acoustic or light waves, such as those generated during radio-wave and infra-red data communications. Examples of machine-readable medium may include but are not limited to carrier waves as describer hereinafter or any other media from which the server 110A can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 110A can receive the data on the telephone line and use an infra-red transmitter to convert the data to an infra-red signal. An infra-red detector can receive the data carried in the infra-red signal and appropriate circuitry can place the data on the bus 305. The bus 305 carries the data to the memory 315, from which the processor 310 retrieves and executes the instructions. The instructions received by the memory 315 can optionally be stored on the storage unit 350 either before or after execution by the processor 310. All such media must be tangible to enable the instructions carried by the media to be detected by a physical mechanism that reads the instructions into a machine.

The server 110A also includes a communication interface 340 coupled to the bus 305 for enabling data communication. Examples of the communication interface 340 include, but are not limited to, an integrated services digital network (ISDN) card, a modem, a local area network (LAN) card, an infrared port, a Bluetooth port, a zigbee port, and a wireless port.

The server 110A can be coupled to a storage device 345 that stores the database. In some embodiments, the database can be stored in the server 110A.

In some embodiments, the processor 310 can include one or more processing units for performing one or more functions of the processor 310. The processing units are hardware circuitry performing specified functions.

Figure 4:
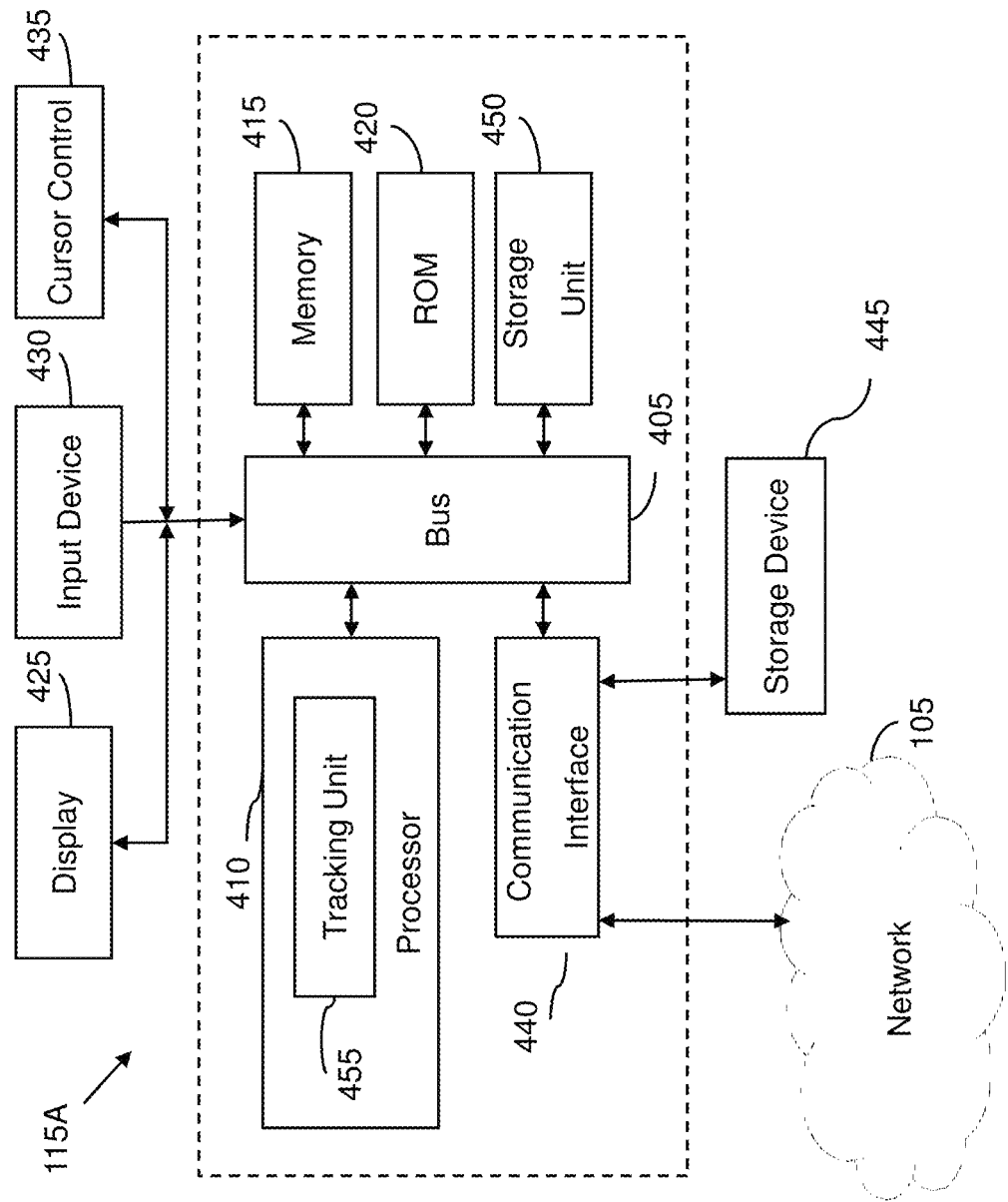
FIG. 4 depicts a block diagram of an electronic device, in accordance with which one embodiment.

FIG. 4 depicts a block diagram of the electronic device 115A. The electronic device 115A includes a bus 405 for communicating information, and a processor 410 coupled with the bus 405 for processing information. The electronic device 115A also includes a memory 415, for example a random access memory (RAM) coupled to the bus 405 for storing instructions to be executed by the processor 410. The memory 415 can be used for storing temporary information required by the processor 410. The electronic device 115A further includes a read only memory (ROM) 420 or other static storage unit coupled to the bus 405 for storing static information and instructions for processor 410. A storage unit 450, such as a magnetic disk or hard disk, can be provided and coupled to the bus 405 for storing information.

The electronic device 115A can be coupled via the bus 405 to a display 425, for example a cathode ray tube (CRT) or liquid crystal display (LCD), for displaying information. An input device 430, including various keys, is coupled to the bus 405 for communicating information and command selections to the processor 410. In some embodiments, cursor control 435, for example a mouse, a trackball, a joystick, or cursor direction keys, for command selections to the processor 410 and for controlling cursor movement on the display 425 can also be present. The functioning of the input device 430 can also be performed using the display 425, for example a touch screen.

The electronic device 115A performs tracking of user's cursor in response to the processor 410 executing instructions included in the memory 415. The instructions can be read into the memory 415 from another machine-readable medium, such as the storage unit 450. Execution of the instructions included in the memory 415 causes the processor 410 to perform the techniques described herein.

The term machine-readable medium can be defined as a medium providing data to a machine to enable the machine to perform a specific function. The machine-readable medium can be a storage media. Storage media can include non-volatile media and volatile media. The memory 415 can be a volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, optical disk, punchcards, papertape, a RAM, a PROM, EPROM, and a FLASH-EPROM.

In some embodiments, the machine-readable medium can be transmission media including coaxial cables, copper wire and fiber optics, including the wires that include the bus 405. Transmission media can also take the form of acoustic or light waves, such as those generated during radio-wave and infra-red data communications. Examples of machine-readable medium may include but are not limited to carrier waves as describer hereinafter or any other media from which the electronic device 115A can read, for example online software, download links, installation links, and online links. For example, the instructions can initially be carried on a magnetic disk of a remote computer. The remote computer can load the instructions into its dynamic memory and send the instructions over a telephone line using a modem. A modem local to the electronic device 115A can receive the data on the telephone line and use an infra-red transmitter to convert the data to an infra-red signal. An infra-red detector can receive the data carried in the infra-red signal and appropriate circuitry can place the data on the bus 405. The bus 405 carries the data to the memory 415, from which the processor 410 retrieves and executes the instructions. The instructions received by the memory 415 can optionally be stored on the storage unit 450 either before or after execution by the processor 410. All such media must be tangible to enable the instructions carried by the media to be detected by a physical mechanism that reads the instructions into a machine.

The electronic device 115A also includes a communication interface 440 coupled to the bus 405 for enabling data communication. Examples of the communication interface 440 include, but are not limited to, an integrated services digital network (ISDN) card, a modem, a local area network (LAN) card, an infrared port, a Bluetooth port, a zigbee port, and a wireless port.

The electronic device 115A can optionally be coupled to a storage device 445.

The processor 410 includes a tracking unit 455. The tracking unit 455 is in communication with a software application, for example a browser application to track the cursor movement to provide various options in the second web page.

In some embodiments, the processor 410 can include one or more processing units for performing one or more functions of the processor 410. The processing units are hardware circuitry performing specified functions.

FIG. 5A-FIG. 5F depicts exemplary screen shots for socializing events.

Figure 5A:
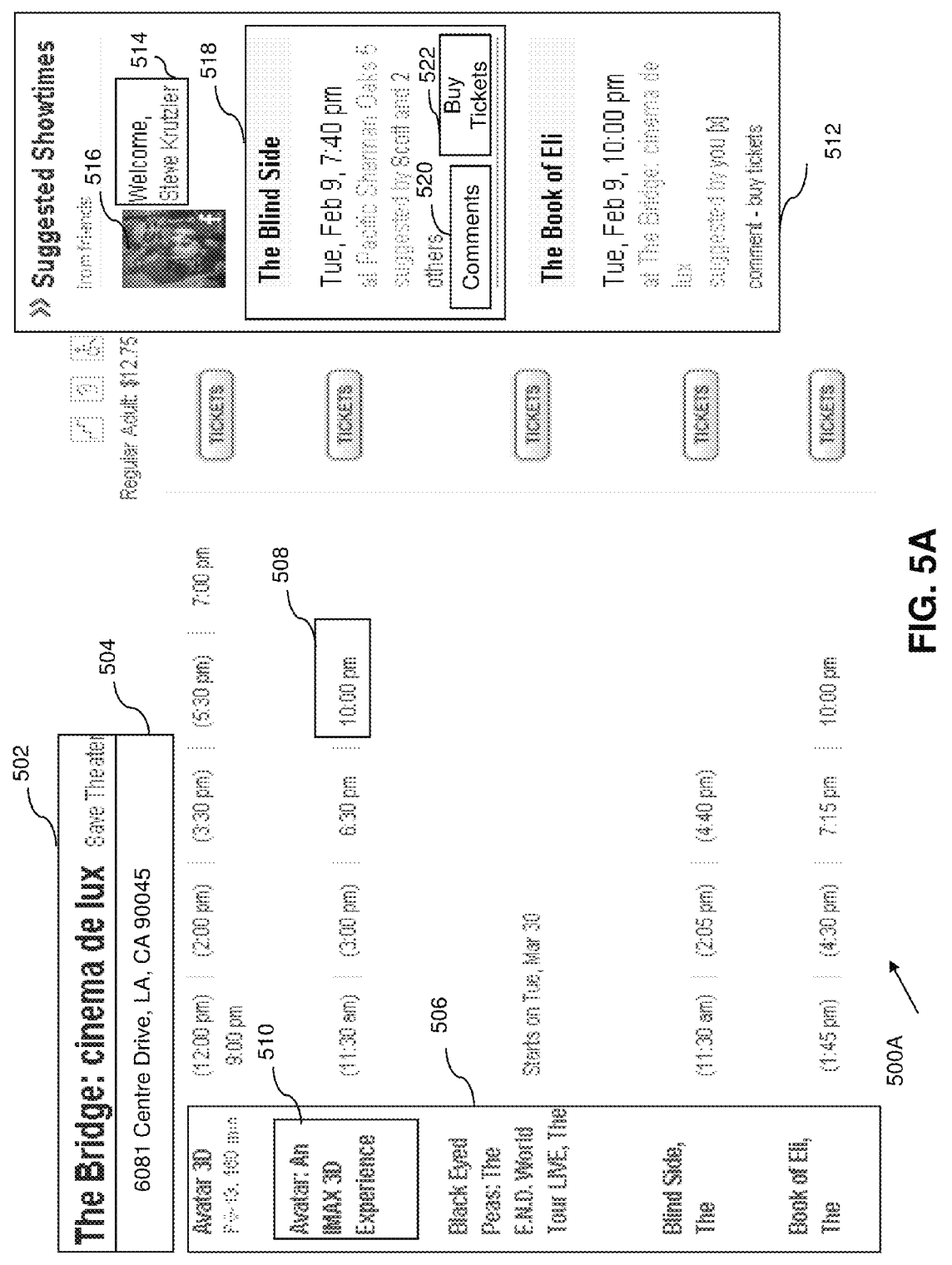

FIG. 5A depicts a screen shot of a web page 500A. The web page 500A includes name of a cinema hall 502, a location 504 of the cinema hall 502, and a list of movies 506. Several showtimes can be there for each movie, for example a showtime 508 corresponds to a movie 510. The web page 500A also includes a panel 512. The panel 512 includes name 514 of a user and picture 516 of the user. An event 518 is displayed in the panel 512. The panel 512 also includes a tab 520 for inputting comments and a tab 522 for buying tickets.

In one example, the server 110A receives a request from the electronic device 115A to display the web page 500A on the electronic device 115A. The server 110A determines if the user, of the electronic device 115A, is logged in to any social network. If the user is already logged in to the social network, for example the Facebook®, then the server 110A displays the web page 500A to the user. The server 110A provides the events posted by the buddies in the panel 512. The panel 512 includes suggested showtimes, for example the event 518. The event 518 can be the first event posted by the first buddy.

In some embodiments, the server 110A also receives a request from the electronic device 115B to display a web page, for example Yahoo!® TV, on the electronic device 115B.

Figure 5B:
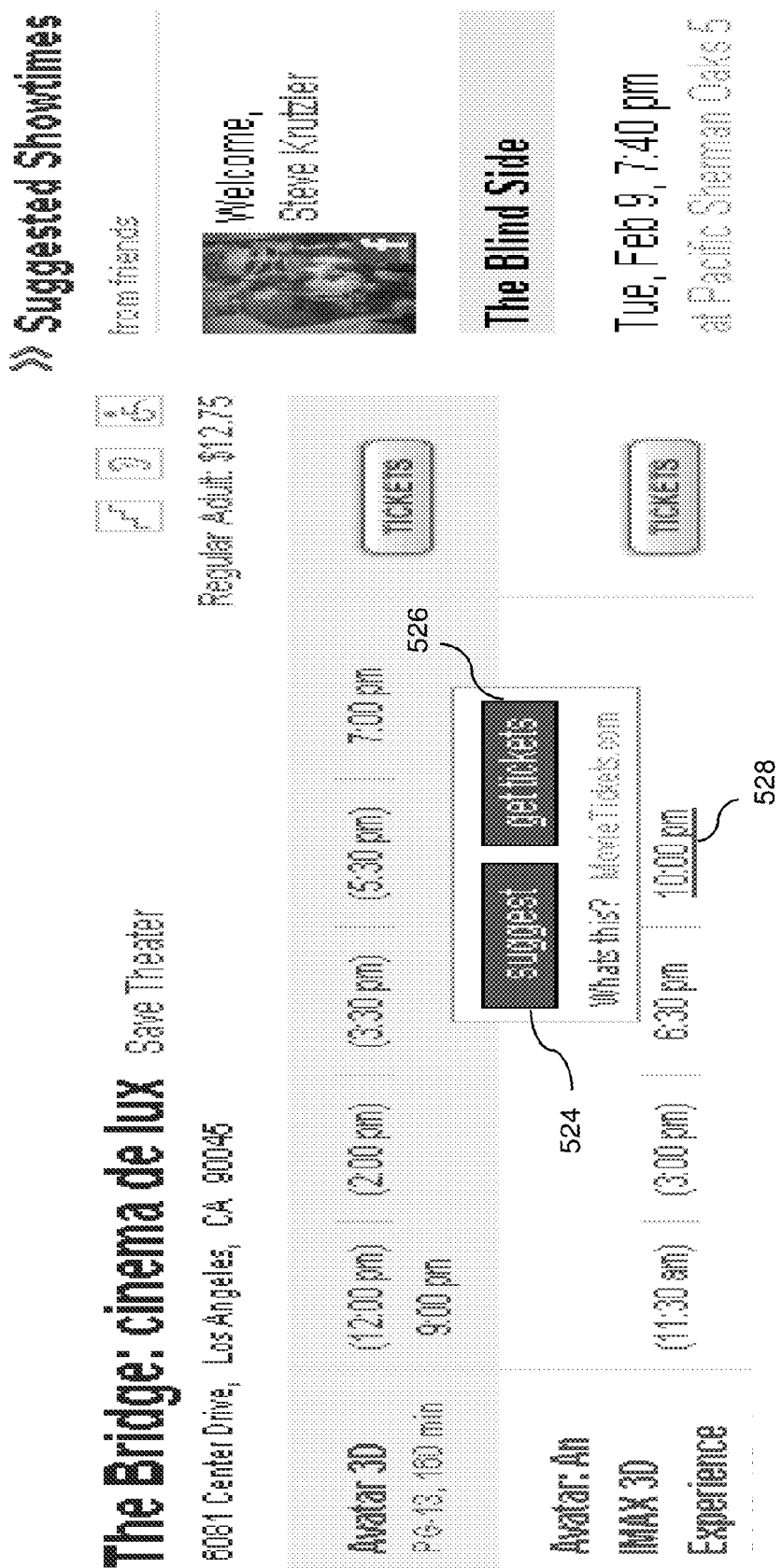

FIG. 5B depicts a screen shot of a web page 500B. The web page 500B includes a tab 524 to make a suggestion and a tab 526 to buy tickets. The electronic device 115B can detect presence of cursor on a showtime in response to activities of the user. The tab 524 and the tab 526 are displayed to the user when the user hovers the cursor on a showtime 528.

In some embodiments, the options are displayed to the first buddy on the second web page when the first buddy hovers a cursor control (similar to the cursor control 435) of the electronic device 115B on a showtime.

Figure 5C:

FIG. 5C depicts a screen shot of the panel 512. The panel 512 includes another event 530. The event 530 can be the second event posted by the user by clicking on the tab 524. The server 110A receives the request from the user to display the another event 530 in the panel 512. The server 110A can perform a check to determine if the another event 530 is not a repeated suggestion. If the another event 530 is not posted earlier by the user then the server 110A displays the another event 530 in the panel 512.

Figure 5D:

FIG. 5D depicts a screen shot of the panel 512. The panel 512 includes a tab 532. The tab 532 is an option provided to the user to join the event 518. Joining an event indicates that the user agrees or the user is interested in the first event.

In some embodiments, a tab similar to the tab 532 can be provided to the first buddy to join the second event 532.

Figure 5E:
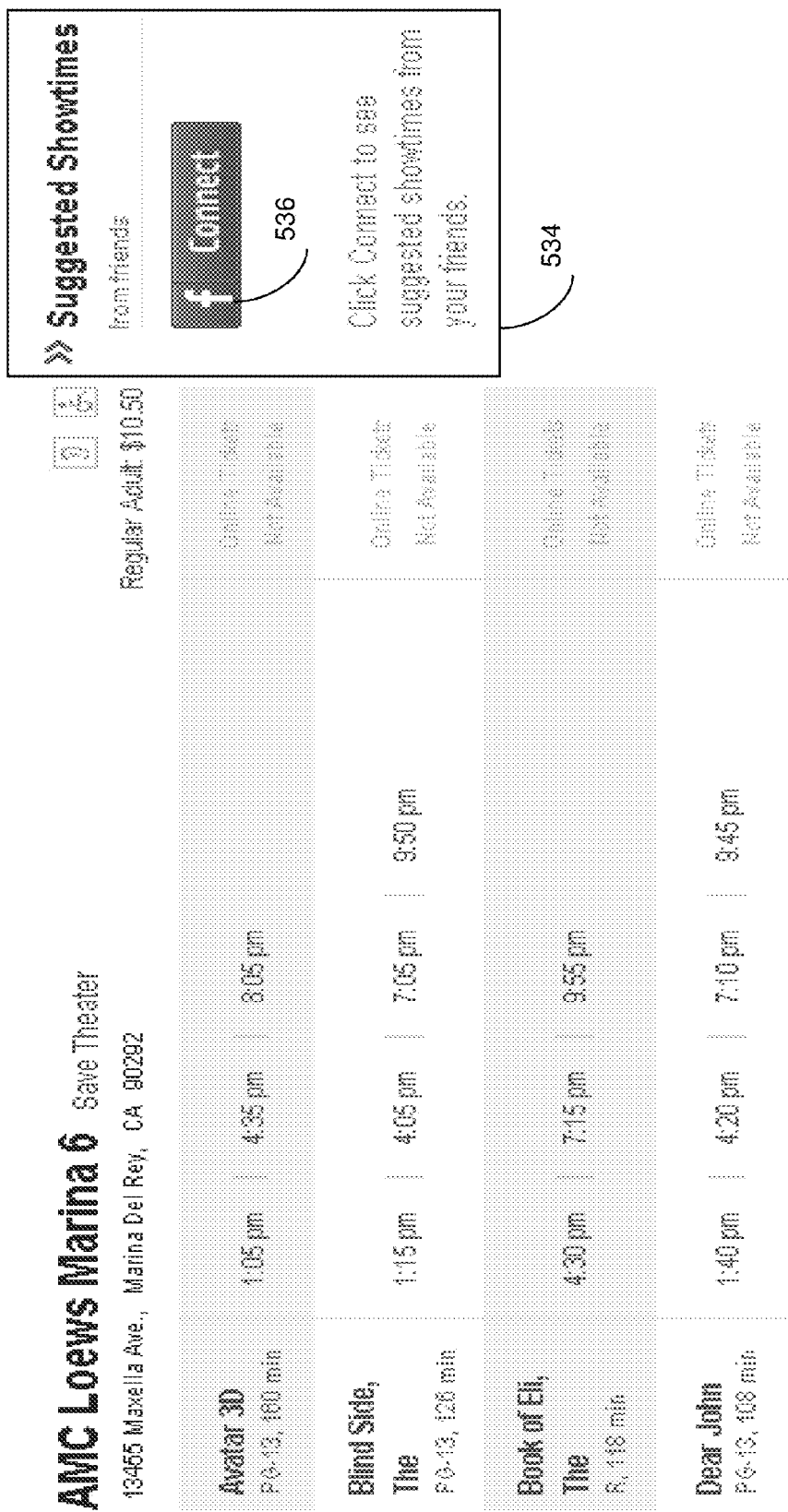

FIG. 5E depicts a screen shot of a web page 500E. The web page 500E includes a panel 534. The panel 534 includes a tab 536. If the server 110A determines that the user is not logged into the social network then the web page 500E is displayed to the user. The web page 500E provides the tab 536 to the user to login to the Facebook®.

Figure 5F:
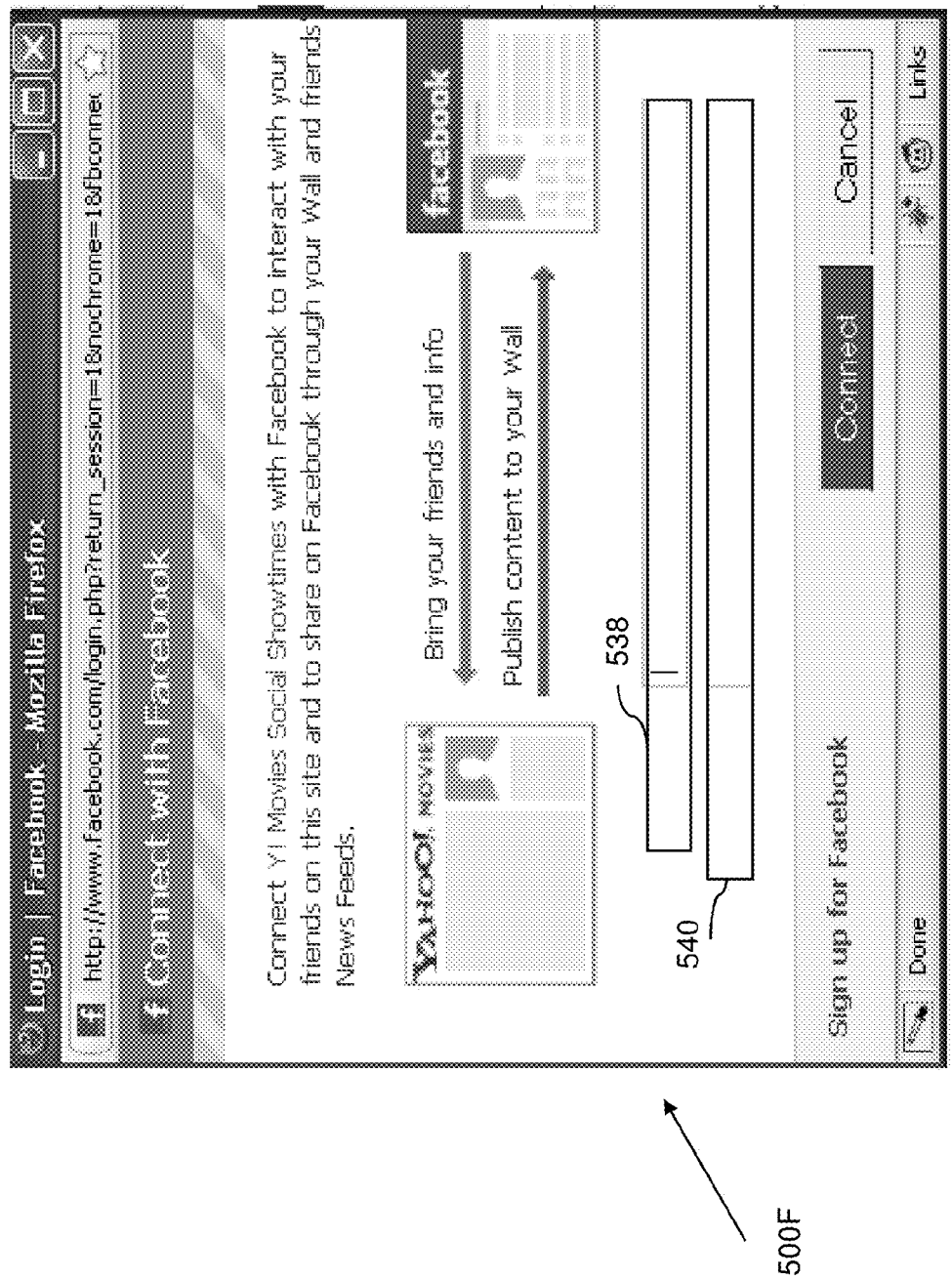

FIG. 5F depicts a screen shot of a web page 500F. The web page 500F allows the user to login to the social network by entering the user email ID in a tab 538 and the user password in a tab 540. If the user is authenticated by the social network server 110B then the server 110A displays the web page 500A to the user.

The server 110A determines the social network associated with the user and the buddies. The server 110A also determines the buddies of the user and identifies the events associated with the buddies and the user. This can help in achieving minimized dependency on the modes to interact with the buddies and determine the buddies who are interested in socializing the events.

While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. A method comprising:
   determining, via a computing device, a social network from a first website associated with a user in response to the user visiting a web page from a second website, wherein the first web site is external to the second web site;
   determining, via the computing device, a first buddy of the user on the determined social network;
   identifying, via the computing device, a first event from events associated with the first buddy which matches an event associated with the web page by performing a check to determine if the first event and the event associated with the web page correspond to a same content type; and
   communicating, via the computing device, the first event and information associated with the first buddy for display on the web page, the information about the first buddy including at least one of the name of the first buddy, a comment by the first buddy, and the time and date when the information was entered by the first buddy.

2. The method as claimed in claim 1, wherein determining the social network comprises
   prompting the user to login to the social network.

3. The method as claimed in claim 1 and further comprising
   providing an option to the user to make a suggestion regarding a second event associated with the web page.

4. The method as claimed in claim 3 and further comprising at least one of:
   displaying the suggestion on the web page; and
   broadcasting the suggestion to one or more buddies of the user.

5. The method as claimed in claim 3 and further comprising
   performing at least one of:
      updating list of events associated with the user; and
      updating list of events associated with the first buddy of the user.

6. The method as claimed in claim 1 and further comprising
   providing one or more of:
      an option to join the first event;
      an option to decline the first event; and
      an option to delete the first event.

7. The method as claimed in claim 1, wherein the first event and the second event is one of:
   a television program showtime; and
   an online program showtime.

8. The method of claim 1, wherein the first event and the event associated with the web page are of the same type, in that they are both one of (a) television programs, and (b) online programs.

9. A system comprising:
   a communication interface to enable communication with one or more electronic devices when desired;
   a memory coupled to the communication interface for storing instructions; and
   a processor, coupled to the communication interface and the memory, and responsive to the instructions to:
      determine, electronically, a social network from a first website associated with a user in response to the user visiting a web page from a second web site, wherein the first web site is external to the second web site;
      determine a first buddy of the user on the determined social network;
      identify a first event from events associated with the first buddy which matches an event associated with the web page by performing a check to determine if the first event and the event associated with the web page correspond to a same content type; and
      communicate the first event and information associated with the first buddy for display on the web page, the information about the first buddy including at least one of the name of the first buddy, a comment by the first buddy, and the time and date when the information was entered by the first buddy.

10. The system as claimed in claim 9, where in the system is in electronic communication with a social network server to enable determination of the first buddy on the social network.

11. The system as claimed in claim 9, wherein each electronic device comprises:
   a display to display the web page including the first event and information associated with the first buddy;
   a tracking unit to track cursor of the user and to provide an option to the user to make a suggestion regarding a second event associated with the web page; and
   a communication interface to enable broadcasting of the suggestion on the social network.

12. The system as claimed in claim 9, wherein the system is coupled to a storage unit that stores the events associated with the first buddy.

13. The system of claim 9, wherein the first event and the event associated with the web page are of the same type, in that they are both one of (a) television programs, and (b) online programs.

14. An article of manufacture comprising:
   a non-transitory machine-readable medium; and
   instructions carried by the medium and operable to cause a programmable processor to perform:
      determining, electronically, a social network from a first website associated with a user in response to the user visiting a web page from a second web site, wherein the first web site is external to the second web site;
      determining a first buddy of the user on the determined social network;
      identifying a first event from events associated with the first buddy which matches an event associated with the web page by performing a check to determine if the first event and the event associated with the web page correspond to a same content type; and communicating the first event and information associated with the first buddy for display on the web page, the information about the first buddy including at least one of the name of the first buddy, a comment by the first buddy, and the time and date when the information was entered by the first buddy.

15. The article of manufacture of claim 14, wherein determining the social network comprises prompting the user to login to the social network.

16. The article of manufacture of claim 14 and further comprising instructions operable to cause the programmable processor to perform at least one of:

displaying the suggestion on the web page; and
broadcasting the suggestion to one or more buddies of the user.

17. The article of manufacture of claim 14 and further comprising instructions operable to cause the programmable processor to perform at least one of:

updating list of events associated with the user; and
updating list of events associated with the first buddy of the user.

18. The article of manufacture of claim 14 and further comprising instructions operable to cause the programmable processor to perform one or more of:

an option to join the first event;
an option to decline the first event; and
an option to delete the first event.

19. The article of manufacture of claim 14, wherein the first event and the second event is one of:

a television program showtime; and
an online program showtime.

20. The article of manufacture of claim 14, wherein the first event and the event associated with the web page are of the same type, in that they are both one of (a) television programs, and (b) online programs.

* * * * *